United States Patent [19]

Zenk et al.

[11] Patent Number: 4,835,672
[45] Date of Patent: May 30, 1989

[54] ACCESS LOCK APPARATUS FOR USE WITH A HIGH PERFORMANCE STORAGE UNIT OF A DIGITAL DATA PROCESSING SYSTEM

[75] Inventors: Daniel K. Zenk, Stillwater; John R. Trost, Coon Rapids, both of Minn.

[73] Assignee: Unisys Corporation, Blue Bell, Pa.

[21] Appl. No.: 36,140

[22] Filed: Apr. 6, 1987

Related U.S. Application Data

[63] Continuation of Ser. No. 596,202, Apr. 2, 1984, abandoned.

[51] Int. Cl.[4] ............................................. G06F 13/18
[52] U.S. Cl. .................................................... 364/200
[58] Field of Search ... 364/200 MS File, 900 MS File; 340/825.5

[56] References Cited

U.S. PATENT DOCUMENTS

| | | | |
|---|---|---|---|
| 3,543,242 | 11/1970 | Adams, Jr. et al. | 364/200 |
| 4,017,840 | 3/1977 | Schild et al. | 364/200 |
| 4,085,444 | 4/1978 | Schneider | 364/900 |
| 4,091,447 | 5/1978 | Dillon et al. | 364/200 |
| 4,130,864 | 12/1978 | Schlotterer | 364/200 |
| 4,151,592 | 4/1979 | Suzuki et al. | 364/200 |
| 4,189,766 | 2/1980 | Horiguchi et al. | 364/200 |
| 4,237,534 | 12/1980 | Felix | 364/200 |
| 4,384,323 | 5/1983 | Ahuja | 364/200 |
| 4,400,771 | 8/1983 | Suzuki et al. | 364/200 |
| 4,415,972 | 11/1983 | Adcock | 364/200 |
| 4,473,880 | 9/1984 | Budde et al. | 364/200 |
| 4,493,036 | 1/1985 | Boudreau et al. | 364/200 |
| 4,503,495 | 3/1985 | Boudreau | 364/200 |
| 4,554,628 | 11/1985 | Bell | 364/200 |

Primary Examiner—Gary V. Harkcom
Assistant Examiner—Christopher Lynt
Attorney, Agent, or Firm—Charles A. Johnson

[57] ABSTRACT

A priority scheme is utilized wherein various Instruction Processors possess predetermined levels of prioritization for gaining storage access. Basically, access locking devices used in this environment perform the function of allowing a single port requester to gain unlimited access to the storage unit port while preventing or locking out access by all other requesters seeking access to that same port. In operation, a plurality of pending prioritized port requests are "snapped" into a plurality of input latches. This snapping step is often referred to as a "snapshot". It is only during this "snapshot" period that pending port requests are allowed to enter the priority latches. In past systems, when a port request was made, accompanied by an access lock signal, all port requests presently residing in the priority latches waiting to be serviced were cleared out and no new requests were accepted into the latches until the next "snapshot" was performed. By causing these lower priority pending requests to be cleared out and not reinstated until a successive "snapshot", many such pending requests timed-out. This invention reduces the number of pending requests timing out.

6 Claims, 10 Drawing Sheets

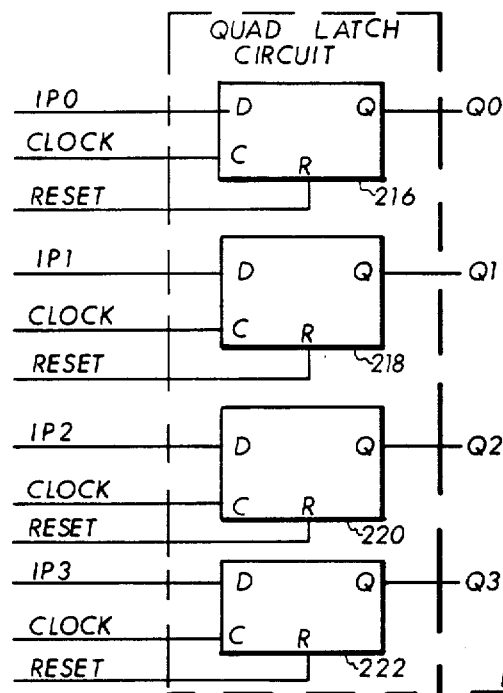
FIG. 7
FIG. 8
LATCH TRUTH TABLE
| D | C | R | QN+1 |
|---|---|---|------|
| L | L | * | L    |
| H | L | * | H    |
| * | H | L | QN   |
| * | H | L | QN   |
| * | H | H | L    |
| * | H | H | L    |
* INDICATES DON'T CARE
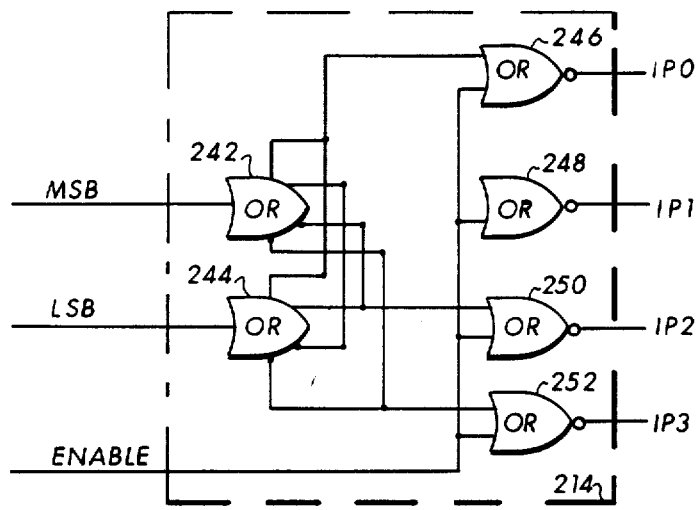
FIG. 11
FIG. 12
TRUTH TABLE
| INPUTS | | OUTPUTS | | | |
|--------|---|-----|-----|-----|-----|
| MSB | LSB | IP0 | IP1 | IP2 | IP3 |
| L | L | H | L | L | L |
| L | H | L | H | L | L |
| H | L | L | L | H | L |
| H | H | L | L | L | H |

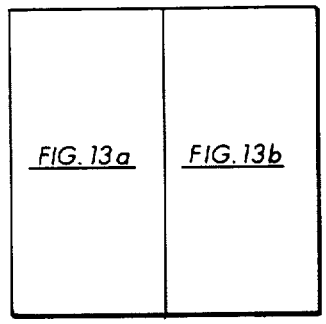
FIG. 13
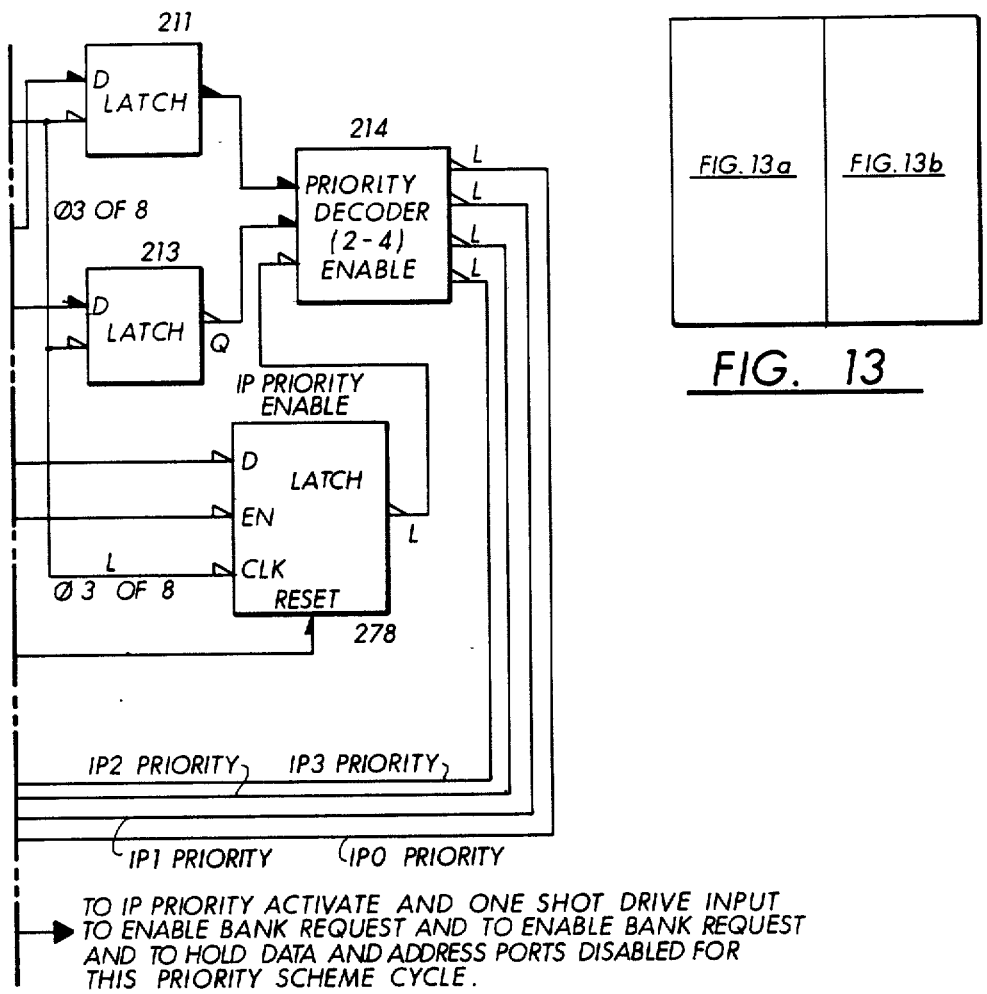
TO IP PRIORITY ACTIVATE AND ONE SHOT DRIVE INPUT
TO ENABLE BANK REQUEST AND TO ENABLE BANK REQUEST
AND TO HOLD DATA AND ADDRESS PORTS DISABLED FOR
THIS PRIORITY SCHEME CYCLE.
FIG. 13b
FIG. 10
| ENCODER TRUTH TABLE ||||||||
| PORT REQUEST INPUTS FROM LATCHES |||| ENCODED OUTPUTS ||||
| IP0 | IP1 | IP2 | IP3 | Q0 | Q1 | Q2 | Q3 |
| H | * | * | * | L | L | H | H |
| L | H | * | * | H | L | H | H |
| L | L | H | * | L | H | H | H |
| L | L | L | H | H | H | H | H |
| L | L | L | L | L | L | L | L |
* DON'T CARE

ACCESS LOCK APPARATUS FOR USE WITH A HIGH PERFORMANCE STORAGE UNIT OF A DIGITAL DATA PROCESSING SYSTEM This is a continuation of co-pending application Ser. No. 06/596,202 filed on Apr. 2, 1984 now abandoned.

RELATED PATENT APPLICATIONS

The following co-pending patent applications are assigned to the assignee of this invention, and their teachings are incorporated herein by reference:
Title: HIGH PERFORMANCE STORAGE UNIT
 Inventor: James H. Scheuneman
 Ser. No.: 596,130
 Filed: Apr. 2, 1984
 U.S. Pat.: No. 4,633,434 Dec. 30, 1986
Title: MULTIPLE UNIT ADAPTER
 Inventor: James H. Scheuneman
 Ser. No.: 596,205 Abandoned; 047,579 (FWC)
 Filed: Apr. 2, 1984
 U.S. Pat. No.: 4,722,052 Jan. 26, 1988
Title: A PRIORITY RQUESTER ACCELERATOR
 Inventors: John R. Trost and Daniel Zenk
 Ser. No.: 530,285
 Filed: Sept. 8, 1983
 U.S. Pat. No.: 4,627,018 Dec. 2, 1986

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly, it relates to an improved High Performance Storage Unit for use in such a digital data processing system. Still more particularly, the invention relates to an improved access lock apparatus for use in such a High Performance Storage Unit.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and time that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an overall control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing a unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is ever increasing. A primary goal in architectural design is to improve the throughput of problem solutions. Such architectures often utilize a plurality of processing units in cooperation with one or more multiple port memory systems, whereby portions of the same problem solution may be parcelled out to different processors or different problems may be in the process of solution simultaneously.

The environment in which the apparatus and method of the present invention is used is in the High Performance Storage Unit (HPSU). It is well known that the memory units of such a data processing system often have a plurality of individual requester ports whereby a corresponding plurality of processor units of varying types may seek access via requests to such memory units. It is believed equally well known that where there are pluralities of such requesters seeking simultaneous access to a particular memory unit that there must be some form of a prioritization system. In earlier prioritization systems, it was often the case that once a particular processor unit gains access to a selected memory as a result of its priority, all other requesters are held in abeyance until the requester which has gained access is satisfied and releases the storage unit.

Also, in these earlier systems, these requesters were constantly seeking access to such a memory. Since the stream was a constant one, there were often later requests which had higher priorities than did the earlier ones. In order to have particular groups which could be prioritized at a particular time, there arose a request system known as a "snapshot" system of prioritizing. In a "snapshot" priority scheme, the number of requesters which are attempting communication with the memory unit, will be frozen or snapped into a queue. All of these requesters, in the queue at the time of the "snapshot" will be serviced, in priority order, before any further request will be considered.

Further, any request in the queue which has been already serviced, will not be reinstated. As is obvious, such a scheme is tantamount to the taking of a photograph of the present group of requests, hence, the name "snapshot". This group of preset requests will be serviced prior to taking another "snapshot".

A further priority feature that must be considered in this description is that on the earlier systems, each of the requesters seeking a particular memory port only held its requester line status for a predetermined period of time. Thus, if a plurality of requesters were snapped into a particular queue, all of the requests must be satisfied in a predetermined time period. If the higher priority requests in the queue took an excessive amount of time to be satisfied, then the lower priority requesters timed out. If this happened, then the whole cycle must be repeated since the request could not be satisfied until it was reinstated into some later priority snap.

Another priority feature that it is important to discuss is the scheme called access lock out. In this operation, each port requester gained access to the memory port, it included the further characteristic of being able to prevent any other requester from gaining access. In other words, it locked out access to the memory port so long as the selected requester required the port. Thus, in current systems, the presence of an access lock signal on a port requester would clear all remaining requests in that "snapshot" forcing all pending port requests to be honored during a later priority "snapshot". As discussed, it was possible for this condition to cause the pending requester to time-out before it was honored.

In systems that utilize a multiplicity of processors to access, a common memory system, either for reading or writing, it has been found necessary to establish an access priority sequence between processors seeking access to the memory system. Memory systems that can accommodate multiple requesters, such as multiple processing units, are designated multiple port or multiple channel memory systems. In such systems, it is necessary to identify the processor seeking access to the memory system, and to enable the appropriate port or channel associated with the identified requester. With multiple requesters, it is common to have requests queued up and to have memory addressing and data to be written available for the queued sources. In the event of a decoding error, that is an error in identifying the proper requester, an entirely erroneous selection of addressing and data to be written can occur. Even assuming that parity is associated with the data words, or an ECC system is incorporated, such decoding errors will often go undetected because the word or words processed in the run stream will be proper and correct, but will be associated with the erroneously identified requester. Since the requests are queued, the memory system is essentially pipelined and is conditioned to handle requests in a predetermined manner. Further, through timing control, the operation of the selection and memory system is overlapped. This means that certain functions related with one requester are being completed while other functions of the next subsequent requester are being initiated. It is clear that errors in decoding, that is erroneous identification of requesters, results in system malfunction that is difficult to isolate and identify if not detected close in time to the occurrence of the error condition.

OBJECTS

It is a primary object of this invention to provide an improved digital data processing system wherein one or more host data processors utilize one or more supporting scientific processors in conjunction with storage systems that are commonly accessible.

Another primary object of the invention is to provide an improved High Performance Storage Unit (HPSU) for use in a data processing system.

It is another object of the present invention to provide an improved memory port requester prioritization circuit for use in such a digital data processor.

It is another object of the present invention to provide an improved memory port requester prioritization circuit for use in a digital data processor which is capable of satisfying all pending requests in a present queue even though certain of the pending higher priority requests possess access lock out characteristics.

It is also an object of the present invention to provide an improved access lock priority circuit for use in a memory port priority system having access lock characteristics which honors all pending memory requests in a single queue regardless of the delay caused by said port access lock.

It is a further object of the present invention to provide an improved access lock prioritization circuit for use in a memory port requester system of a digital data processing system which is capable of honoring all requests pending in a single "snapshot" queue even though the higher priority memory requesters in that queue possess access lock out capabilities.

It is a further object of the present invention to provide an improved access lock circuit for a port requester which honors pending requests, being delayed because of access lock capabilities on higher priority requests, in the present priority snapshot, possibly shortening the time delay in which pending requests are honored.

It is a still further object of the present invention to provide an improved access lock circuit for use on a memory port requester system which circuit enables all pending memory port requesters to be honored in a single snapshot in spite of any delay caused by the higher priority requesters in the same snapshot.

It is also a further object of the present invention to provide an improved access lock circuit for use in prioritized memory port requester systems having access lock capabilities wherein all pending requesters are satisfied in a single "snapshot" queue to thereby minimize the number of lower priority requests timing-out.

The foregoing objectives and other more detailed and specific objects will become apparent and be understood from the drawings and the description of the invention.

SUMMARY OF THE INVENTION

The digital data processing system includes one or more host processors each coupled to one or more hight performance storage units. Host processors can be selected from units available commercially, where th 1100/90 System available from Sperry Corporation is found to be particualarly advantageous.

The hight performance Storage Unit (HPSU) is unique, and is basically a memory unit capable of coupling to various pluralities of instruction processors, and input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing system.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor through the use of a single Scientific Processor port to a plurality of up to four HPSU's via for HPSU ports. In this manner, Scientific Processors may address, read and write any location in any of the HPSU's.

The MUA is used in a scientific data processing system to interface at least one Scientific Processor a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide overall increased performance for scientific vector FORTRAN programs. The SP can be selected from processors available commercially.

Each of the HPSU's includes the facility for satisfying multiple access requests made to a particular one its plurality of memory ports. To accomplish this requires some form of prioritization system. In the present instance, the previously discussed "snapshot" system of prioritization is implemented. As noted, many earlier "snapshot" systems included means associated with certain of the request access lines for locking out the access of the remaining access request lines of the "snapshot". Because of this access restriction, there was often a timing out of the other request lines since their access was postponed until a later "snapshot".

Currently, a port requester for the HPSU which possesses access lock characteristics may not allow a copending port requester to be honored until a later priority snap. This condition as previously noted may cause other copending requesters to time out before they are honored. The present invention will allow all pending requests in a single priority "snapshot" queue to be honored during the current priority snap. By satisfying all pending requesters in the present priority snap, the likelihood of requesters timing out diminishes. It accomplishes this by causing the HPSU to become active whenever any one of the received priority request signals from the Instruction Processors (IP) is enabled. Subsequent to this activation of the HPSU, a plurality of encoding signals created from combinations of the most significant bit (MSB) and the least significant bit (LSB) will determine which IP port will be allowed access to the HPSU i.e. has control. If an access lock condition exists on any IP port request line, then the IP priority active signal will be disabled after the request cycle is completed. Because of this early disabling, the remaining IP requests of lesser priority in that particular "snapshot" will thereafter be serviced, thereby reducing the time formerly necessary to satisfy such requests in the presence of an access lock.

BRIEF DESCRIPTION OF THE DRAWINGS

FIG. 7 is a more detailed logic diagram of the latch circuit shown in FIG. 6;

FIG. 8 is a truth table for the latch circuit of FIG. 7;

FIG. 10 is a truth table for the encoder circuit of FIG. 9;

FIG. 11 is a more detailed logic diagram of the decoder illustrated in FIG. 6;

FIG. 12 is a truth table for the decoder circuit of FIG. 11;

DETAILED DESCRIPTION OF THE PREFERRED EMBODIMENT

A. Conventions

Figure 1:
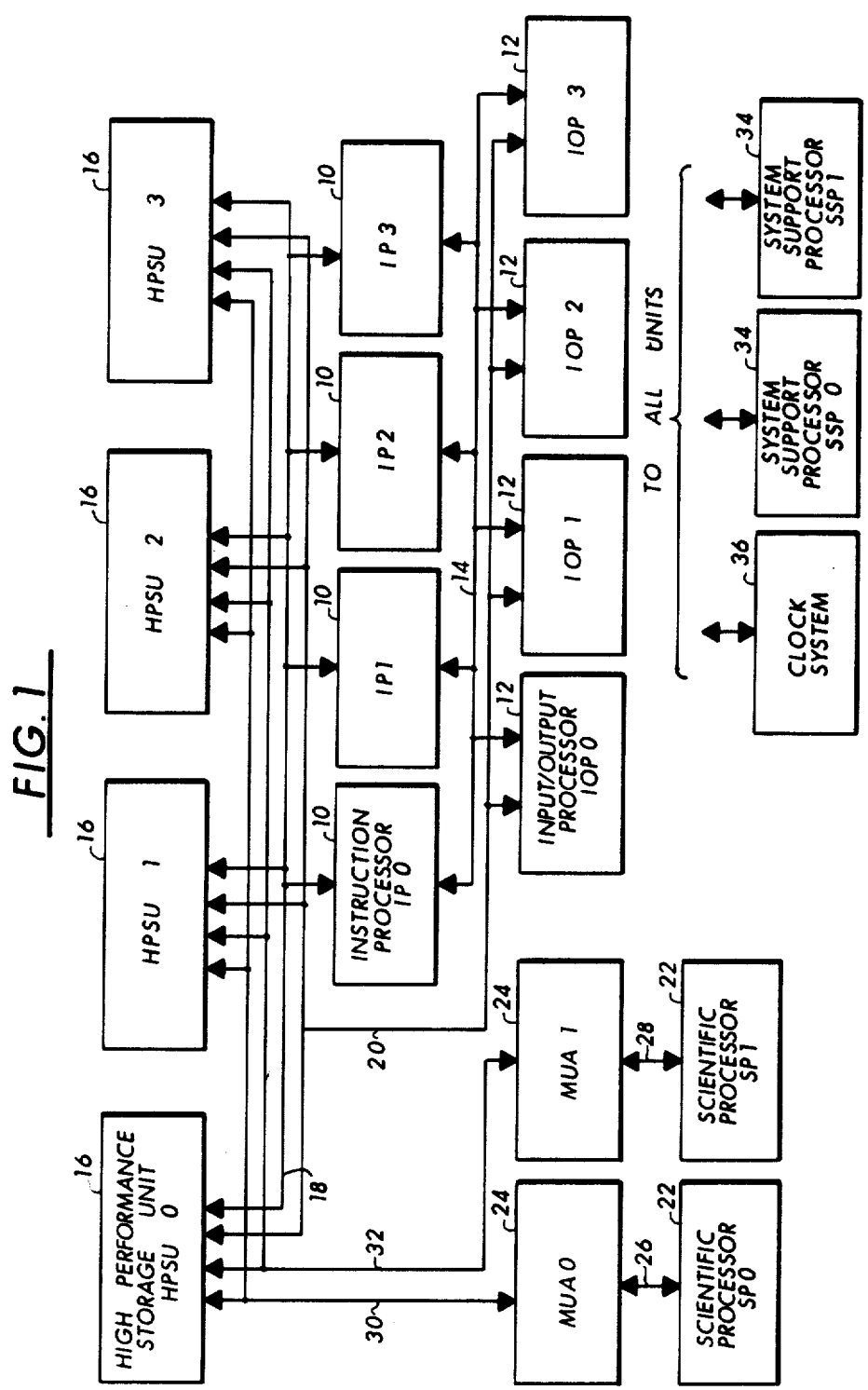
FIG. 1 is a system block diagram of the overall digital data processing system in which the invention can be utilized.

Throughout the following description and in the accompanying drawings, there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams, the arrowhead will indicate the direction of signal flow for the particular data or control signals identified. Where appropriate, emphasis for particular lines may be added to indicate specific paths, for example, through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many, it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is, of course, understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated 1, and the like, the designations within the block symbols of the respective functions is readily understandable to those skilled in the art. More complex macro logical functions, for example, multiple input Exclusive OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In similar manner, if an A symbol is illustrated having two or more open-arrowhead inputs, the function designated is that of Low AND, and will be satisfied only when all inputs are Low. It is apparent that this Low AND function is logically equivalent of a high OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking, the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND function, the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially modular and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatible. The IP provides basic mode and extended mode instruction execution, virtual machine capability, and contains two buffer memories (not shown, one an operand buffer, and the other an instruction buffer. Each IP is functional to call instructions from memory, execute the instructions, and in general does data manipulation. The IP also executes instructions to set up input and output data buffers and channel access control.

In conjunction with the IP's from one to four Input-/Output Processors IOP0 through IOP3, labelled 12, can be utilized. The interconnections between the IP's and the IOP's, collectively labelled 14, are, in fact, direct connections between each unit, and the interconnection is not bussed. Each IOP can be a Type 3067-00 unit available from Sperry Corporation, or an equivalent type of processor. The IOP's handle all communications between the IP's and the memory systems and the peripheral subsystems (not shown). In this type of configuration, the IP's function as the system Central Processing Units, and the IOP's act as CPU's to handle all of the communications. The IP's and IOP's are commonly referred to as the 1100/90 system.

From one to four High Performance Storage Units HPSU0 through HPSU3, each labelled 16, can be utilized in the system. Each HPSU is a free-standing unit with eight memory banks, each bank containing 524K words. Each HPSU provides four Instruction Processor (IP) ports for providing communication paths to the IP's, both for reading and writing, shown collectively as interconnection paths 18. Again it should be understood that interconnection between each HPSU and each IP is directly cabled, and is not bussed. Each HPSU also includes four Input/Output Processor (IOP) ports for interconnection with the IOP's. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified copending incorporated patent applications.

In the embodiment illustrated one or two Scientific Processor SP0 and SP1, labelled 22, can be utilized. If a single SP is used with a single HPSU, it may be coupled directly to the SP port of such HPSU. When two or more HPSU's are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP function under direction of one or more of the IP's to perform scientific type calculations in a support mode. In this regard, the IP's can be considered to be host processors and the SP's can be considered to be support processors, all operating through common storage.

The overall system maintenance and supervision is accomplished through one or two System Support Processors SSP0 and SSP1, each labelled 34, which are connected to all units of the system. The SSP is available commercially and is utilized in the Sperry Corporation 11/90 Systems. In general, it is understood that each SSP performs the function of a hardware maintenance panel for the system. The display and setting of information, the activation of most maintenance facilities, selecting modes of operation and the like, is done at the control section of the SSP.

A clock system 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock. The clock system is novel and is described in one of the above identified copending patent applications.

Intercommunication between units is essentially on a request and acknowledge basis, and the interfaces will be described in more detail as appropriate.

C. High Performance Storage Unit (HPSU)

Figure 2:
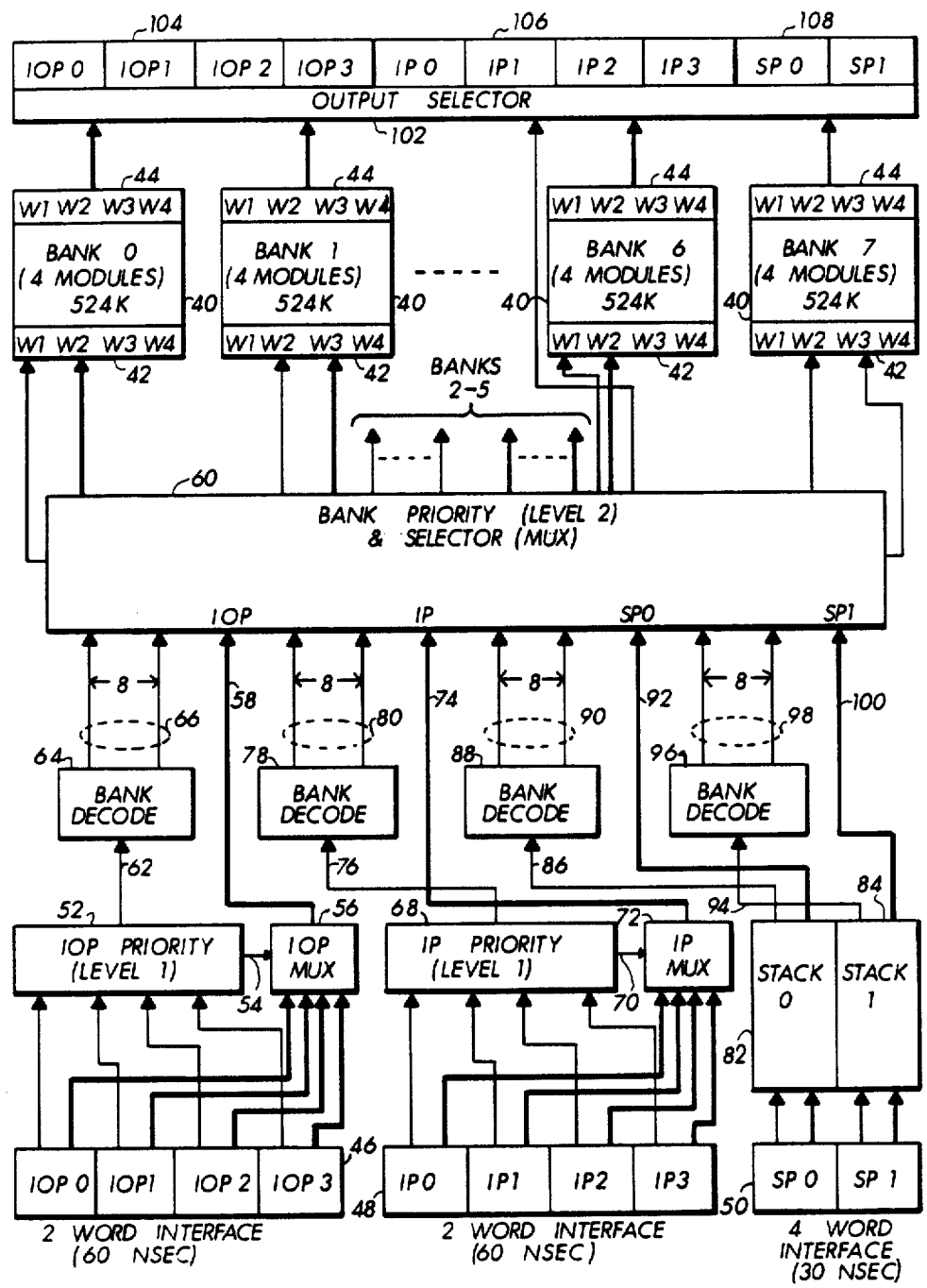
FIG. 2 is a simplified functional blocked diagram of the High Performance Storage Unit.

FIG. 2 is a simplified functional blocked diagram of the High Performance Storage Unit.

The HPSU is a storage device that is commonly accessible by the IP's, the IOP's and the SP's via the MUA's. The various devices that can be coupled to the HPSU can have differing interface systems and operational rates.

In the preferred embodiment, the HPSU utilizes eight banks of storage devices, generally identified as bank 0 through bank 7 of which banks 0, 1, 6 and 7 are illustrated and each labelled 40 since they are essentially similar. Though not specifically illustrated, each bank is comprised of four memory modules and each bank has a total capacity of 524K words. A word in memory is 44-bits, of which 36-bits are data bits and the remaining eight bits are utilized for Error Correction Code (EEC) check bits and parity bits. Each bank 40 is arranged for receiving four words W1, W2, W3 and W4 labelled 42 for writing and four such words labelled 44 when read out.

The memory banks 40 include the addressing circuitry, the storage cells, the timing circuits and the driver circuits and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IP's at the four IP ports designated IP0 through IP3. The IOP ports 46 and the IP ports 48 each operate on a two word interface at a clock rate of 60 nanoseconds.

The HPSU also has an input SP interface 50 which can accommodate two SP's at the two ports labelled SP0 and SP1. The SP ports each function with a four word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56, which functions to select the appropriate data and address information to pass on line 58 to the Bank Priority and Selector (MUX) 60. The control signals provided on control path 62 drive the Bank Decode 64 for selecting one of eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first in, first out (FIFO) circulating buffer. The request information feeds out of Stack 0 on line 86 to the Bank Decode 88 which provides a one of eight selection and data passes on line 92 to the Bank Priority Selector 60. Similarly, request information passes on line 94 to the Bank Decode 96 for making selections on lines 98, while the data passes on line 100.

The Bank Priority and Selector functions to select between the IOP, IP and the two SP requests presented to it for accessing memory. It also functions to control the Output Selector 102 when reading is to take place.

The HPSU has an IOP output 104 capable of handling four IOP ports IOP0 through IOP3. It also has an IP output 106 capable of handling four IP ports labelled IP1 through IP3. Finally, it has an SP output 108 capable of handling two SP output ports labelled SP0 and SP1. Data rates and timing at the output ports 104, 106 and 108 are similar to those for the input ports previously described.

D. Multiple Unit Adapter (MUA)

Figure 3:
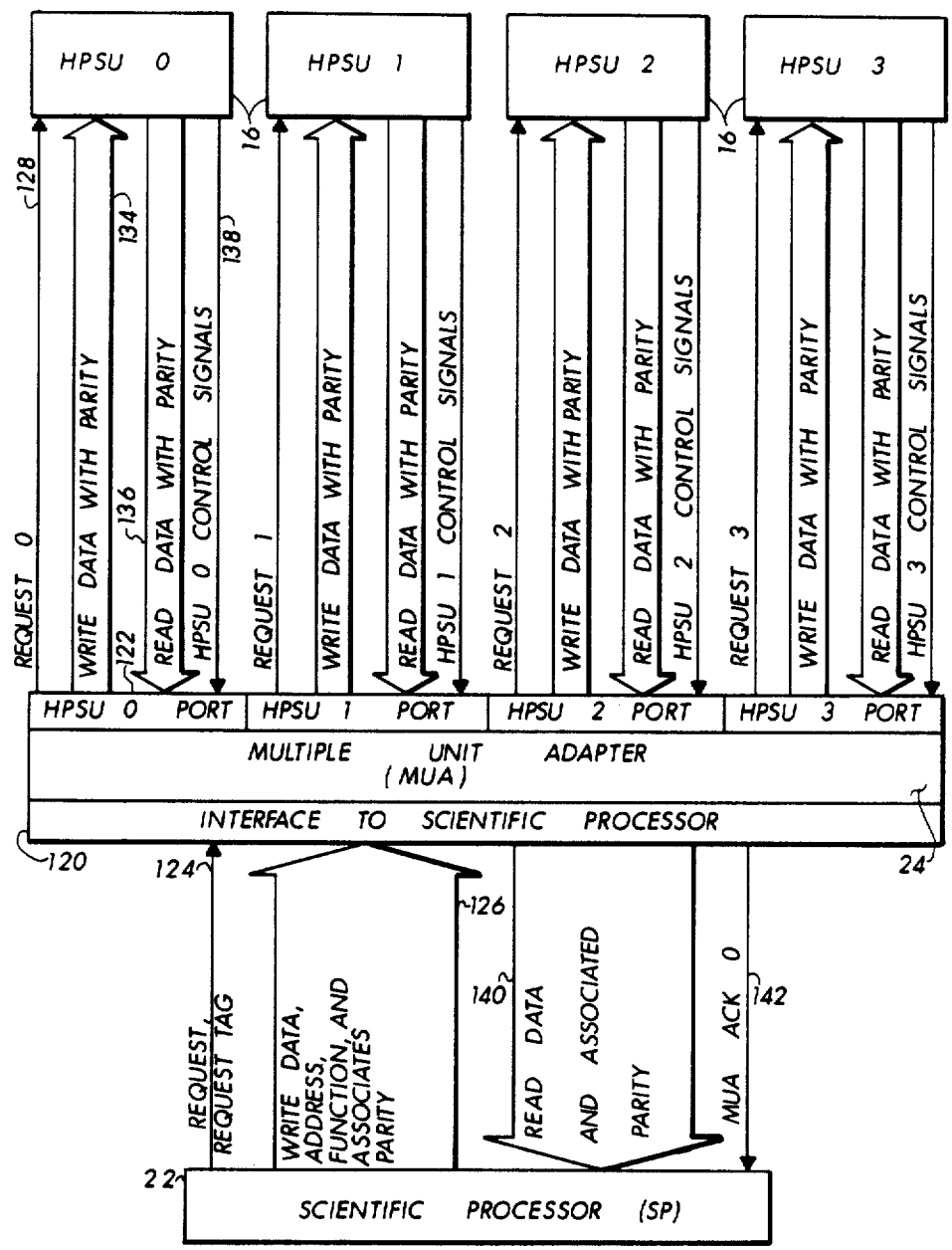
FIG. 3 is a simplified blocked diagram of the Multiple Unit Adaptor (MUA) for providing selective interconnection of a Scientific Processor to one of up to four High Performance Storage Units.

FIG. 3 is a simplified blocked diagram of the Multiple Unit Adapter (MUA) for providing selective interconnection of a Scientific Processor to one of up to four High Performance Storage Units.

The MUA 24 has an interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function and associated parity is provided via cable 126. The MUA can accumulate up to eight requests from the SP without acknowledgement, and the requests and the associated data are stored in a first in, first out (FIFO) stack (not shown).

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU without acknowledgement, the MUA ceases requesting until an Acknowledge 1 (ACK 1) control signal is received in control cable 138.

The control and data path lines for HPSU1, HPSU2 and HPSU3 would function in a similar manner. When the SP requests access to a different HPSU, all outstanding requests to the first HPSU must be serviced prior to the MUA processing requests to a different HPSU.

All data and control signals from the SP are passed on to the HPSU, and all data and control signals from the HPSU are passed on to the SP with the exception of a few special control signals. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits and the function code field a total of 7-bits.

E. Scientific Processor (SP)

Figure 4:
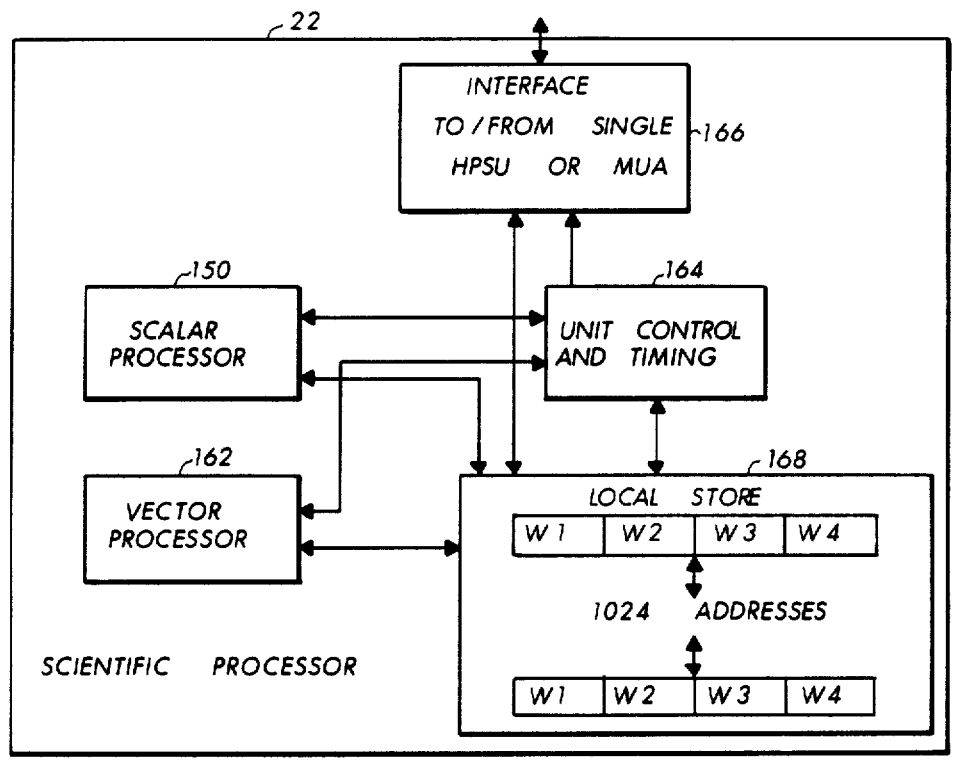
FIG. 4 is a simplified blocked diagram of the Scientific Processor.

FIG. 4 is a simplified blocked diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any privileged modes of operation. The SP includes distinct modules, the Scalar Processor 150, the Vector Processor 162, the Unit Control Timing 164, the Interface 166, and the Local Store 168.

The Vector Processor module 162 performs vector calculations. The Scalar Processor module 150 performs scalar operations, and also has the overall control function including instruction fetch and issue. Generally speaking, the Scalar and Vector Processor modules operate in a parallel although some Scientific Processor instructions require both modules to execute.

The Local Store 168 in the preferred embodiment comprises a high speed random access memory (RAM) 4,096 words. The arrangement of such that four words W1 through W4 are accessed simultaneously, yielding an addressable range of 1,024 addresses. The Local Store 168 is used primarily for the storage of frequently used scalar variables, and it should be noted, is distinguished from the relatively large dedicated memory sections in prior art support processors, the minimal storage being rendered sufficient through the coupling to the plurality of HPSU's.

The general system environment and background described with regard to FIG. 1 through FIG. 4 is set forth to indicate the complexity of the data processing system in which the subject invention may be utilized.

The invention has particular application to the HPSU, and in general, provides the access locking capability of the port selection. In the following descriptions, the frame of reference will be the HPSU, it being understood that each unit coupled to the HPSU, whether it be IOP, IP or SP, will be designated as a "Requester", thereby indicating a request for access to the memory.

The following listing identifies the named signals according to the number of conductors relative to each type of requester unit. It will be understood that other signal lines may be used for other types of control functions, but are not defined or discussed since they do not add to an understanding of the subject invention.

| HPSU/REQUESTER INTERFACE SIGNALS | | | | |
|---|---|---|---|---|
| | NUMBER OF LINES | | | DIRECTION |
| SIGNAL | IOP | Ip | Sp | REQUESTER |
| REQUESTER AVAILABLE | 2 | 2 | 2 | To HPSU |
| HPSU AVAILABLE | 2 | 2 | 2 | From HPSU |
| REQUEST | 1 | 1 | 1 | To HPSU |
| ACKNOWLEDGE 1 | 1 | 1 | 1 | From HPSU |
| ADDRESS | 24 | 24 | 22 | To HPSU |
| ADDRESS PARITY | 4 | 4 | 3 | To HPSU |
| WRITE DATA | 72 | 72 | 144 | To HPSU |
| WRITE DATA PARITY | 8 | 8 | 16 | To HPSU |
| READ DATA | 72 | 72 | 144 | From HPSU |
| READ DATA PARITY | 8 | 8 | 16 | To HPSU |
| FUNCTION CODE | 5 | 5 | 6 | To HPSU |
| FUNCTION CODE PARITY | 1 | 1 | 1 | To HPSU |
| START | 6 | 6 | 0 | To HPSU |
| START PARITY | 1 | 1 | 0 | To HPSU |
| END | 6 | 6 | 0 | To HPSU |
| END PARITY | 1 | 1 | 0 | To HPSU |

In the following discussion of the drawings, certain abbreviations will be utilized. In this regard, request is REQ, address is ADRS, function is FUNC, multiplexer is MUX, enable is EN, register if REG, error is ERR, exclusive OR is Xor and an AND function is A.

F. Improved Access Lock Apparatus for the HPSU

Figure 5:
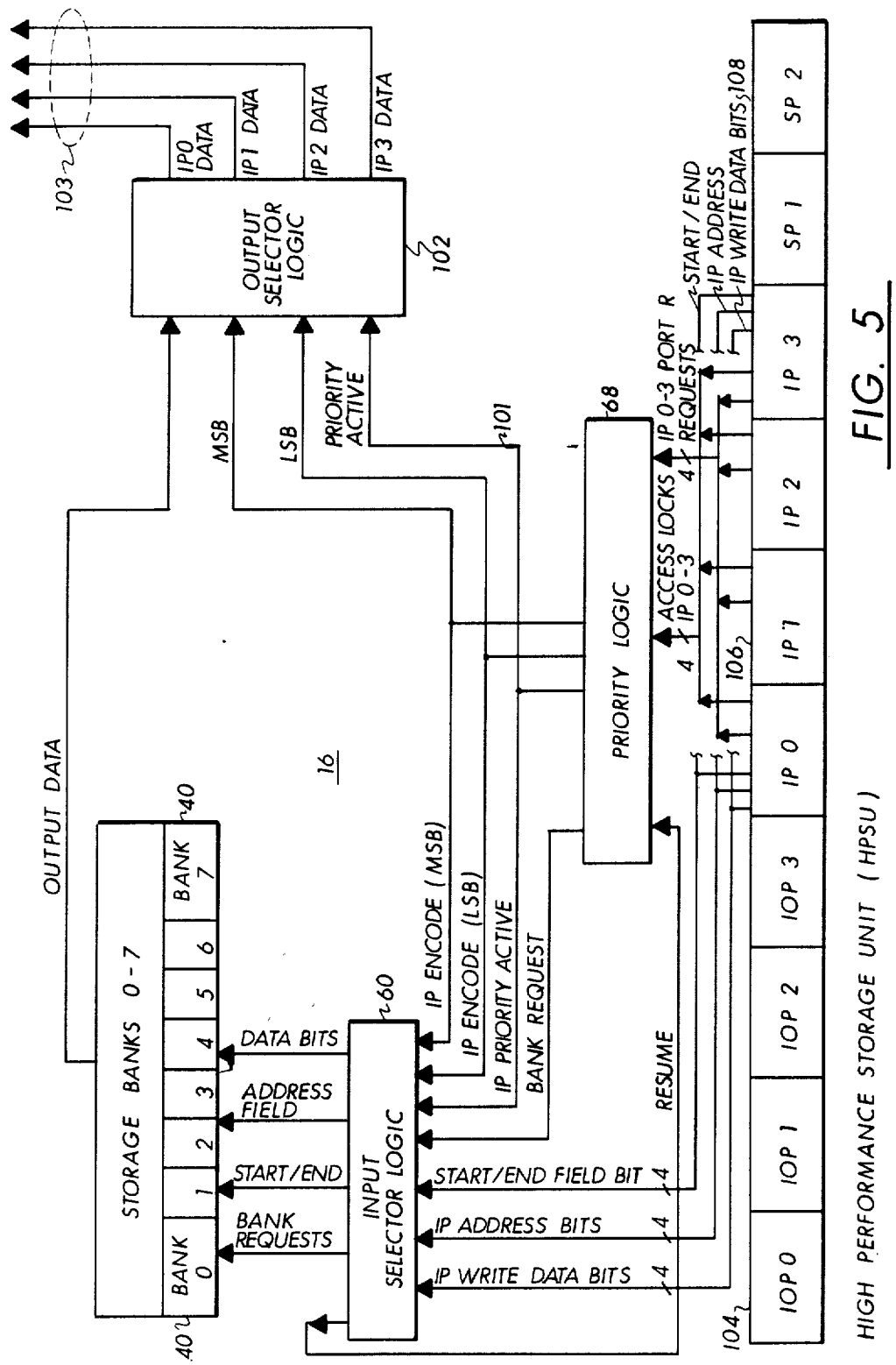
FIG. 5 is a simplified block diagram of the invention as positioned in the High Performance Storage Unit (HPSU)

FIG. 5 illustrates, in a simplified block diagram the position of the present invention in the High Performance Storage Unit of FIG. 2. The background for the following general description has been given in the aforementioned four basic figures in an effort to clarify the use of the present invention in an overall scientific data processing system. The following description will attempt to more clearly set forth, in detail, the operation of the present invention.

More specifically, therefore, FIG. 5 is a basic block diagram of the request and access lock scheme used in the HPSU of FIG. 2.

Referring again to FIG. 5, whenever the Instruction Processor (IP) priority active signal 101 via the Priority Logic 68, the HPSU 16 becomes active. The most significant bit (MSB) and the least significant bit (LSB) from the Encoder (FIG. 6) portion of the Priority Logic 68 will determine which IP input 106 enters the Selector Logic 60 of the HPSU.

The Priority Logic 68, thus, controls which IP request has priority to enter the HPSU and in addition, it determines if an access lock condition exists with that request. An access lock condition, as previously noted, is a copending signal with the request signal which prevents access by any other IP, once that request signal gains control of the HPSU. In the present invention, therefore, if an access lock signal accompanies the IP port request, the IP priority active signal is disabled. This disabling causes the IP path to the HPSU to be disabled after the request cycle is completed. In this manner, the HPSU is not available to any other IP and is in unique control of the IP port requester that possesses the access lock control signal. This control, of course, continues for the full time of the request cycle. On the following new "snapshot", or IP request cycle, on the port that had the access lock, the new IP request is given immediate control of the HPSU. However, if no access lock exists on this new IP request, the HPSU will honor the pending IP requests in priority. It is in this area that the advantages of the present invention become most evident, since in the prior system these pending requests would not be serviced. In fact, these pending requests would have been removed completely from this "snapshot".

In any event, at the same time, the IP requester encoded signals, i.e., the MSB and the LSB signals, are sent to the Selector Logic they are simultaneously sent to the Output Logic 102. There, they cause the output data fields from the Storage Module 103 to be selectively directed to the particular Instruction Processor (IP) that made the request. In addition to the encoded signals, a blank request signal is sent to the Selector block which indicates the particular bank being selected.

Figure 6:
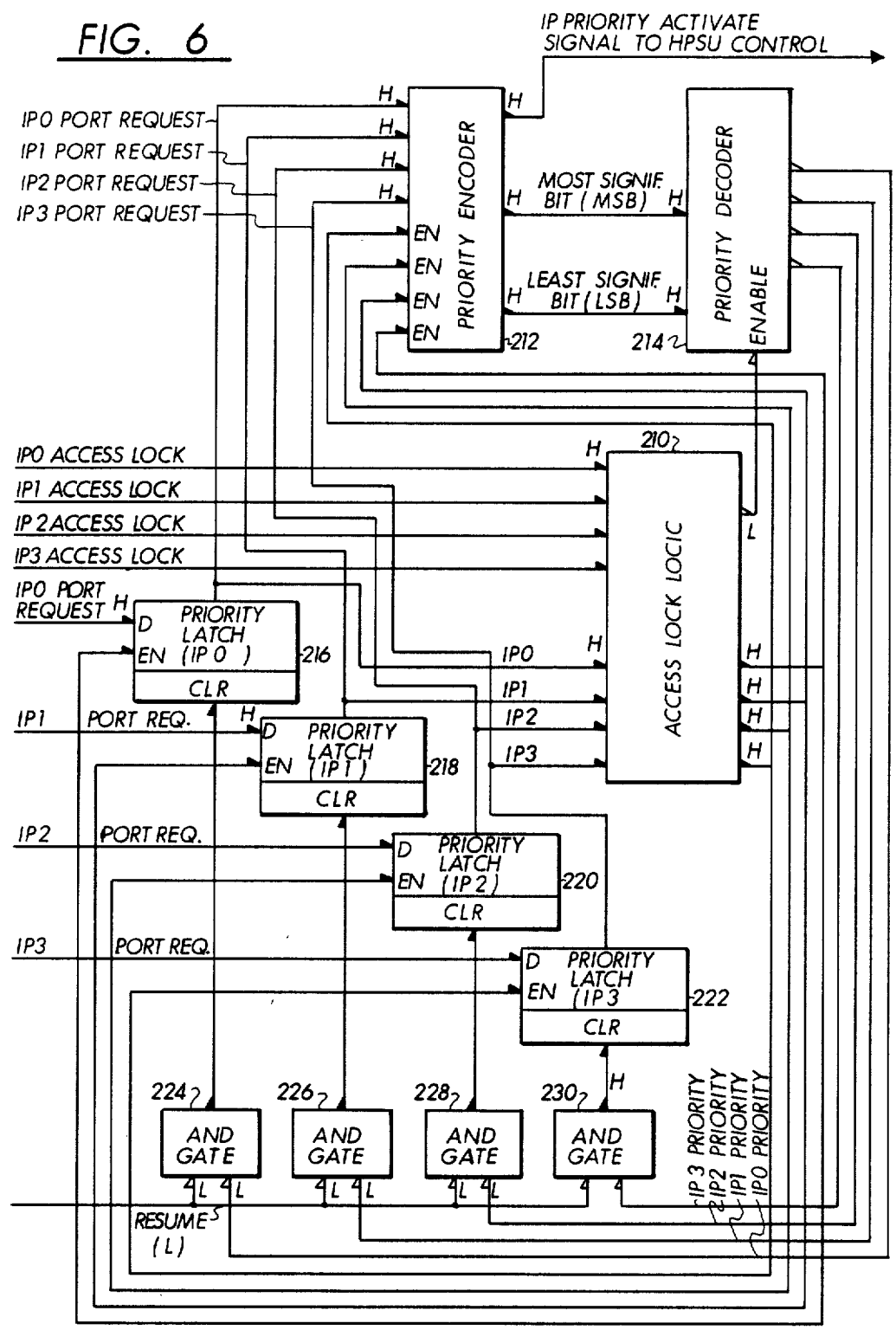
FIG. 6 is a more detailed logic block diagram of the present invention.

FIG. 6 is a more detailed version of the Priority Logic 68 and the Selection Logic 60 of FIG. 5. The four port request signals IP0, IP1, IP2, and IP3 from the Instruction Processors are respectively received by the four priority latches 216, 218, 220 and 222. Depending upon their signal level, i.e., High (H) or Low (L) the port request signals cause their respective latches to be activated. These respective port request signals with their corresponding levels and thus, passed on to the Priority Encoder 212. As will be explained later in the discussion of this Encoder, upon receipt of any active high signal, the priority activate output signal is forced high. Whenever the IP priority activate signal is enabled, the HPSU, itself, is activated.

The other two output signals from this Encoder 212 are the most significant bit (MSB) and the lease significant bit (LSB) of the encoded input signal. It is this encoded combination of the LSB and the MSB signals which determine which of the Instruction Processors simultaneously making request to the HPSU will be successful in gaining access. The Priority Logic Block 68 of FIG. 5, of course, Indicates to the Encoder 212 which of the IP port requests has priority. It also indicates to the HPSU whether or not the port request signal is accompanied by a corresponding access lock signal. If an access lock condition does exist with the IP port request being satisfied, the IP priority activate signal to the HPSU is disabled, thereby, causing the IP path to the HPSU to be disabled as soon as the request cycle is completed.

When a new IP request occurs on the port that previously possessed the access lock condition, it immediately gains control of the HPSU since that "window"

was the only access that was available. However, if no access lock condition existed with this new IP request, the HPSU will honor the remaining requests pending from the previous "snapshot" still remaining in the priority latches.

From this, it is seen that when an access lock condition exists with an IP port requester, such a condition will allow the port requester to completely control priority in the HPSU. That is, no other port requesters will be allowed to enter the priority latches 216, 218, 220 and 222, hence, no port requests presently in these priority latches will be honored after the port requester accompanied by an access lock signal in the previous cycle is received in the present cycle not accompanied by an access lock signal.

As previously noted, a priority request scheme occurs whenever there is a "snap" of the port requests. This is a condition where those requests presently on the input lines are entered into the latches 216, 218, 220 and 222. Each new "snap" is asynchronous and will only occur after the previous priority request "snap" has all of its port requests cleared from the latches.

The operation of circuit FIG. 6 is as follows: The Priority Encoder 212 in response to the requesters IP0, IP1, IP2 and IP3, announces to the HPSU which port requester has priority. This is accomplished via the MSB and the LSB signals emanating from the Encoder 212. The Encoder 212 also provides a priority active signal which, in turn, activates the HPSU. The priority latches 216, 218, 220 and 222 contain the port requests to be honored in the priority "snapshot". The Decoder 214 receives these encoded signals (MSB and LSB) and upon decoding, announces which of the port request is active in the priority request scheme. Thus, from this Decoder, as will be described in detail later, a single output signal of the four (IP0, IP1, IP2 and IP3) is sent to one of the AND gates 224, 226, 228 and 230.

Note that these output signals from the Decoder 214 are low (L) when active. The simultaneous presence of a low signal from one of the Decoder 214 output lines and a corresponding low (L) signal from the resume pulse will activate the respective one of the four AND gates 224, 226, 228 and 230. This activation, in turn, will provide a high (H) output signal which will clear the respective one of the priority latches. This will clear out the current port request and the system will then go on to the next request in the priority latches 216, 218, 220 and 223 and the entire cycle will be repeated.

The Access Lock Block 210 controls the operation of the entire circuit shown in FIG. 6. Once an access lock (H) signal is received by the access lock logic block 210 and it is honored, the access lock block is disabled. This causes the H output signal to go low and since it was the presence of this H signal that was previously returned to the enable input of the priority latches 216, 218, 220 and 222 to enable them, the absence of this H signal will disable the latches. However, and this is important, they are not cleared, merely disabled. That is, they still contain the unhonored requests. Similarly, these enabling signals from the Access Lock Logic 210 were also sent to the enabling inputs of the Priority Encoder 212. Consequently, the Encoder 212 is also disabled. This disables the IP priority activate signal to the HPSU and the HPSU is therefore in a locked state. The Decoder 214 outputs are also disabled by this same activity.

The HPSU will remain in this locked condition until a request is received from the same IP that caused the locked condition. Upon receipt of this new request, it must be determined whether or not an access lock condition still accompanies the port requester. If it does, of course, the HPSU remains in the locked condition, since the new request with an access lock condition maintains control of the HPSU. However, if an access lock condition no longer accompanies the new request, then at the end of that request cycle, the operation of priority continues as formerly described. That is, it returns to process those unhonored requests made in the last "snapshot".

Thus, with the invention access lock circuit, pending port requests will not be cleared out of the priority scheme when a port requester accompanied with an access lock signal receives priority. Instead, the priority latches 216, 218, 220 and 222 will not be cleared out as in the past, but rather will continue to contain the former priority scheme.

G. Building Blocks

FIG. 7 illustrates the latch circuit that may be used in the input latch portion of FIG. 6. That is, input latches 216, 218, 220 and 222 would be included in the circuit shown in FIG. 7. They are high speed, low power latches.

The complete latch circuit features four D type latches 216, 218, 220 and 222 with independent reset or clear inputs and also independent clock inputs. A latch circuit of a similar order might be the MC 10175/MC 10575 Latch manufactured by the Motorola Corporation. In each of the present latch circuits, data is transferred in the negative edge of the clock and latched on the positive edge. Any change on the data input to the latch will be reflected at the output while the clock is low. The outputs are latched on the positive transition of the clock. While the clock is in the high state, a change in the information level present at the data input (D) will not affect the level of the output information (Q). The reset (R) or clear (CLR) input is enabled only when the clock (C) is in the high state.

The latch circuit truth table for the circuit of FIG. 7 is shown in FIG. 8. Inputs D, C and R denote the information input D, the clock input C and reset input R. Output information is noted as Qn where n indicates the latch number in the cluster. Therefore, $Q_0$, $Q_1$, $Q_2$ and $Q_3$ indicate the latch output of inputs IP0, IP1, IP2 and IP3, respectively. The term Qn+1, of course, indicates the output of the next higher level output.

Figure 9:
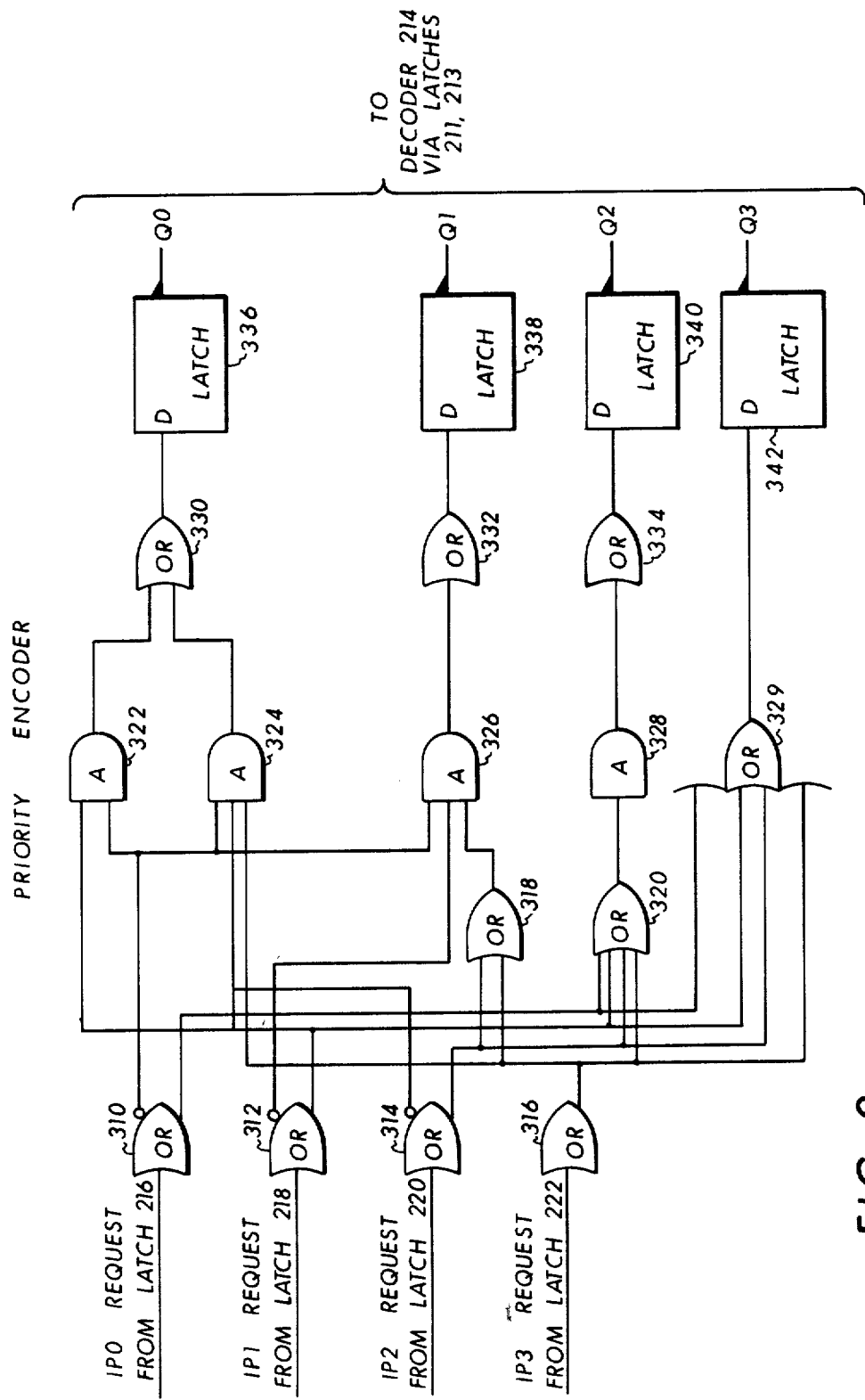
FIG. 9 is a more detailed logic diagram of the encoder circuit used in FIG. 6.

FIG. 9 is the detailed logic diagram of the Priority Encoder 212. It is a circuit designed to encode four input signals IP0, IP2 and IP4 to a binary coded output. A commercially available Encoder of a similar order might be the MC 10165/MC 10565 Encoder manufactured by the Motorola Corporation. Thus, the inputs enter OR gates 310, 312, 314 and 16. AND gates 322, 324, 326 and 328 are activated by the simultaneous presence of signals received either directly from OR gates 310, 312, 314 and 316 or via OR gates 318 and 320. OR gates 329, 330, 332 and 334 are activated by these AND gates to set output latches 336, 338, 340 and 342. The output code is that of the highest order input signal. Any input of lower priority is ignored. Each output line incorporates a latch circuit allowing synchronous operation. When the clock signal is low, the output signals follow the input signals. The output signals are latched when the clock signal goes high. The input signal is considered active when high. This means that both of the output signals MSB and LSB are low when the input IP0 is high.

FIG. 10 is the truth table for the Priority Encoder 212 illustrated in detail in FIG. 9. Note that as the high input signal ripples down through the inputs, the output signals MSB and LSB change from low and low to high and high. Thus, for a high IP0 input signal both outputs MSB and LSB are low. For a high IP1 input signal the MSB and LSB output signals now respectively provide a low and a high signal. A high IP2 input signal provides the converse situation. Finally, a high IP3 input signal produces a pair of high output signals for MSB and LSB.

The Decoder 214 of FIG. 6 is shown in detail in FIG. 11. It converts two lines of input data, namely the most significant bit (MSB) and the least significant bit (LSB) to one of four output signals. The selected output is high while all other output signals are low. The enable signal forces all output lines low when it goes high. Thus, various combinations of input signal levels of MSB and LSB enter OR gates 242, 244. The four output signals from the OR gates 242, 244 are passed to OR gates 246, 248, 250 and 252. These signals are various combinations of high and low signals as illustrated in FIG. 12.

FIG. 12 is the truth table for the decoder 214 illustrated in FIG. 11. It is readily seen from the figure that when input MSB and LSB are both low (L) only the IP0 output signal is high (H). Similarly, when the input MSB is low (L) while the input LSB is high (H) only output signal IP1 is high (H). When these input levels are reversed, only output signal IP2 is high. Finally, when both MSB and LSB are high (H), then only IP3 is high (H).

H. Detailed Logic

Figure 13A:
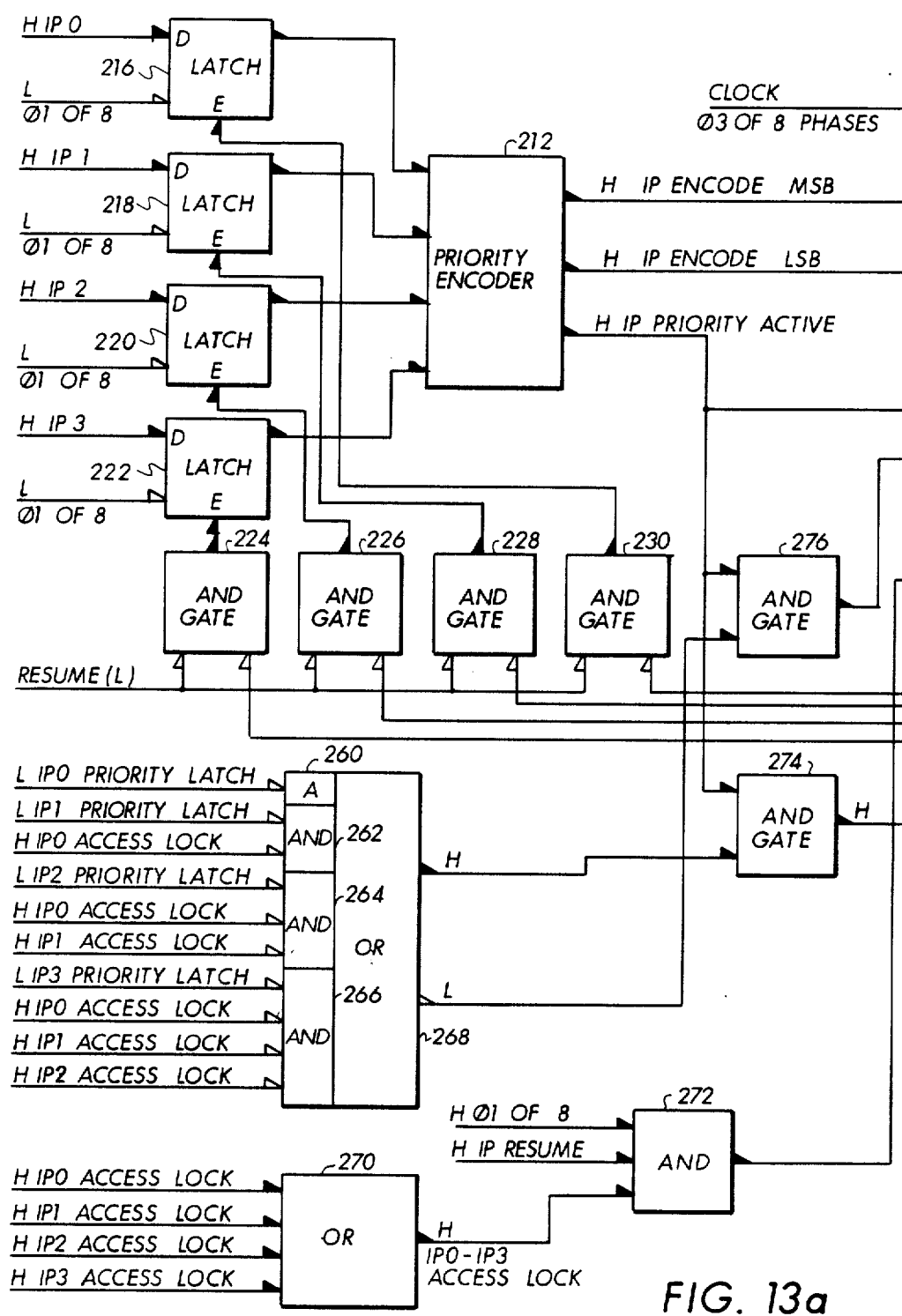
FIG. 13 shows the orientation of FIG. 13a and FIG. 13b which one a detailed logic diagram of the access lock logic shown in FIG. 6 including the latch circuits of FIG. 7, the encoder of FIG. 9 and the decoder of FIG. 11 to illustrate the overall operation of the invention.

FIG. 13 is a complete logic diagram showing in detail the present invention. Basically, when a request scheme is snapped into priority, AND gates 260, 262, 264, 266 and OR gate 268 become active. AND gate 274 becomes enabled since the IP priority active signal is also already present at its input. Its enablement initiates a driver circuit (not shown) to produce a sixty nanosecond pulse for requesting one of the eight banks of memory included in the HPSU. This output signal also holds data and address input ports disabled during the period of this priority scheme cycle. The activation of OR gate 268 causes the deactivation of AND gate 276 since it lacks the necessary inputs. The deactivation of AND gate 276, in turn, provides an enabling input signal to latch circuit 278. When the input clock pulse to the same latch circuit is received two clock pulses later (03 of 8), it is activated. This activation causes the priority decoder 214 to be enabled and the selected IP priority signal is produced as one of the four output signals from the Decoder 214. These four output lines are respectively connected to the four AND gates 225, 226, 228 and 230. Thus, one of these four AND gates now has the selected IP priority signal as its input. Priority is now active until this individual access request is satisfied. If an access lock signal is received for the access request presently active in priority, a number of simultaneous events occur. First, at the end of the request cycle, the AND gates 260, 262, 264, 266 and OR gate 268 are disabled. This produces a Low (L) output signal. The latch circuit 278 is reset because of the activation of AND gate 272 at 01 of the eight clock phases. Also AND gate 276 is enabled by the disabling of OR gate 268. The enabling of AND gate 276 produces an enabling input signal which clears the latch circuit 278. The clearing of latch circuit 278 disables the priority decoder 214 which prevents any further output therefrom. Finally, AND gate 274 is disabled which removes the disabling signals to the input ports. This frees the request ports for the receipt of new address and data for the port that had the access lock accompanying the request.

When the same port receives a request but without an access lock signal, it immediately gains control since that port was the only one enabled. Thus, it is quickly snapped active into priority but no further new requests are allowed to enter the input latches. This is a noticeable difference from the previous access lock configuration, wherein the same port that had the access lock, along with higher priority requests, would be snapped into the input latches as a new "snapshot" priority scheme. As previously noted, this forced the lower priority requests in the previous priority scheme to be delayed until a subsequent priority "snapshot" before they could be honored. This additional delay often resulted in the time out of these requests.

Returning to FIG. 13, the latches 216, 218, 220 and 222 "look" at the IP interface to the HPSU. When an IP request occurs, it is latched into an appropriate one of the latches. A code of MSB and LSB is announced to the HPSU reflecting the current IP port that has control. Also, the HPSU becomes active when the IP priority active signal is produced by the Encoder 212. Whenever an access lock accompanies an interface request, the HPSU will complete the request cycle and thereafter shut down the IP path in the HPSU via AND gates 260, 262, 264, 266 and OR gate 268 which becomes enabled.

To reiterate, pending IP requests in the latches 216, 218, 220 and 222 are not able to be honored until the access lock signal is disabled and the new IP request occurs in the same IP port. The aforementioned AND gates and OR gate 268 will disable and allow the HPSU to become active (i.e., the IP priority active signal from the encoder going high). The IP0, IP1, IP2 and IP3 signals on the input interface from the Instruction Processors.

While the drawings and specification describes an embodiment of an access locking circuit, wherein lower priority request are satisfied during a present "snapshot" rather than being delayed until a subsequent priority "snap", it should be understood that it is within the scope of the present invention to provide for other embodiments which utilize this concept.

In view of the foregoing, it can be seen that the various stated objectives and purposes of the invention have been achieved. It is, of course, understood that various changes in logical circuit arrangement, circuit selection and functionality will become apparent to those skilled in the art after having considered the teaching of applicant without departing from the spirit and scope of the invention. Accordingly, what is intended to be protected by Letters Patent is set forth in the claims.

What is claimed is:

1. An improved memory access locking circuit for a priority circuit of a memory unit with a repetitious cycling means to provide a repetitious memory cycling signal and a plurality of port request storage means connected to receive and store a plurality of memory port request signals, said improved memory access locking circuit comprising:

(a) access lock means connected to each of the plurality of port request storage means and also connected to receive a corresponding plurality of memory access locking signals, said access lock means including further means for creating a disabling signal upon the simultaneous receipt of a memory port request signal and a memory access locking signal by a selected one of said plurality of port request storage means, said disabling signal coupled back to the remaining plurality of port request storage means to prevent the clearing out of the plurality of memory port request signals stored in those remaining plurality of port request storage means and to grant sole access to said memory unit by said selected port request storage means so long as the port request storage means is simultaneously receiving the memory port request signal and the memory access locking signal;

(b) encoding means connected to all of said plurality of port request storage means to receive and encode the plurality of memory port request signals stored therein into a prioritized sequential order;

(c) decoding means connected to said encoding means to decode the encoded priority of the plurality of memory port request signals and provide a single output decoded signal; and (d) a plurality of gating means connected between said decoding means and said plurality of port request storage means to selectively provide a clearing signal to the selected one of said plurality of port request storage means having a memory port request signal which is accompanied by a memory signal to enter only that selected port request storage means which has been cleared while maintaining the previously stored request signal contents of the port request storage in those uncleared port request storage means for later granting access upon receipt of a new memory port request signal unaccompanied by a memory access locking system.

2. The invention as set forth in claim 1 wherein said plurality of gating means comprise a plurality of individual AND gates individually coupled to said plurality of port request storage means for individual and selective control thereof by said AND gates upon the simultaneous application of the repetitious memory cycle signal from the memory unit to all of said AND gates and a single output decoded signal from said decoding means to selected one of said AND gates to thereby selectively clear one of said port request storage means so that it can receive the next memory port request signal awaiting that port request storage means.

3. The invention as set forth in claim 1 wherein the encoding means encoded the most significant bit and the least significant bit of the memory port request signals it receives and forwards these encoded signals to said decoding means.

4. An improved access locking system for a multiport high performance storage unit with a repetitious memory cycling means to provide a repetitious memory cycling signal, said memory access locking system having a first of priority latch means connected to receive and to store a corresponding plurality of memory port access request signals, said improved memory access locking system comprising:

(a) priority encoding means connected to the plurality of latch means to receive therefrom a priority status of each of said plurality of latch means, and to encode said latch means into a prioritized sequence;

(b) access lock means connected to receive a plurality of access lock signals and also connected to the plurality of priority latch means to selectively receive one of the plurality of memory port access request signals from said first plurality of latch means, said access lock means further including means for providing a disabling signal upon the simultaneous receipt of a selected memory port access request signal and a correspondingly selected access lock signal and to provide said disabling signal to each of those priority latch means which have not been so simultaneously selected;

(c) said access lock means to further provide an enabling signal to each of those nonselected priority latch means on the memory cycle following the removal of the correspondingly selected access lock signal to said access lock means;

(d) priority means connected to said priority encoding means to decode means to decode priority encoded signals received from the priority encoding means and in response thereto provides a selected signal, which corresponds in selectivity to the selectively received one of the plurality of memory port access request signals received from said first plurality of latch means, said selected signal provided by said decoding means coupled back to the correspondingly selected latch means of said first plurality of latch means to provide a clearing signal thereto in response to the next signal from said repetitious memory cycling means and thereby allow the next pending request signal awaiting access to that selected latch means to enter that cleared port of the multiported high performance storage unit thereto causing only the selected latch means to be cleared while only disabling the non-selected latch means to allow the contents of the on-selected latch means to remain.

5. The invention as set forth in claim 4 further including a plurality of gating means which comprise a plurality of individual AND gates individually coupled to reset upon activation, each of said first plurality of priority latch means, and each of which AND gates is responsive to the simultaneous input of a signal from the priority decoding means and a signal from the repetitious memory cycling means.

6. The invention as set forth in claim 5 wherein the encoding means encodes the most significant bit and the least significant bit of the priority request signals it receives and forwards these encoded signals to said decoding means.

* * * * *